US008348595B2

(12) United States Patent
Koch et al.

(10) Patent No.: US 8,348,595 B2
(45) Date of Patent: Jan. 8, 2013

(54) SEALING SYSTEM BETWEEN BEARING AND COMPRESSOR HOUSING

(75) Inventors: Silvio Koch, Kirchheimbolanden (DE); Edward R. Panek, Anthem, AZ (US); Lauro Takabatake, Campinas (BR); Daniel Ward, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 534 days.

(21) Appl. No.: 12/440,797

(22) PCT Filed: Sep. 27, 2007

(86) PCT No.: PCT/US2007/079693
§ 371 (c)(1),
(2), (4) Date: Feb. 5, 2010

(87) PCT Pub. No.: WO2008/042698
PCT Pub. Date: Apr. 10, 2008

(65) Prior Publication Data
US 2010/0139270 A1  Jun. 10, 2010

Related U.S. Application Data

(60) Provisional application No. 60/827,543, filed on Sep. 29, 2006.

(51) Int. Cl.
*F01D 25/18* (2006.01)
(52) U.S. Cl. .................. 415/111; 415/104; 415/112
(58) Field of Classification Search .............. 415/110, 415/111, 112, 175, 176, 104; 60/605.3; 384/369; 417/407
See application file for complete search history.

(56) References Cited

U.S. PATENT DOCUMENTS 4,157,834 A * 6/1979 Burdette .................... 277/306
4,418,537 A   12/1983 Iwamoto et al.
(Continued)

FOREIGN PATENT DOCUMENTS
EP     0035891 B1    5/1985
(Continued)

OTHER PUBLICATIONS

European Search Report dated Nov. 28, 2011.

*Primary Examiner* — Ninh H. Nguyen
*Assistant Examiner* — Liam McDowell
(74) *Attorney, Agent, or Firm* — William G. Anderson; Stephan A. Pendorf; Patent Central LLC

(57) ABSTRACT

A turbocharger oil discharge assembly (301, 501, 701, 901) can have a thrust collar (324, 524, 724, 924) with a first radially outwardly extending wall and a second radially outwardly extending wall to define a first annular channel. The first radially outwardly extending wall can have an annular flange that at least in part defines a second annular channel. The assembly can also have a thrust bearing (340, 540, 740, 940) having a radially inner end received in the first annular channel, and an insert (400, 600, 800, 1000). An oil collection chamber (440, 640, 840, 1040) can be defined at least in part by a drainage channel of the insert (400, 600, 800, 1000), the annular flange of the thrust collar (324, 524, 724, 924) and the thrust bearing (340, 540, 740, 940). Pressurized oil discharged from an oil release interface can be directed towards a radially outer region of the oil collection chamber (440, 640, 840, 1040) and can be collected in the oil collection chamber (440, 640, 840, 1040) for subsequent exhaust.

20 Claims, 14 Drawing Sheets

U.S. PATENT DOCUMENTS

| | | |
|---|---|---|
| 4,453,837 A | 6/1984 | Shimizu et al. |
| 4,986,733 A * | 1/1991 | Fleury et al. ................. 415/230 |
| 5,145,334 A | 9/1992 | Gutknecht |
| 6,126,414 A | 10/2000 | Koike |
| 6,935,849 B2 * | 8/2005 | Gutknecht ................... 417/407 |
| 2007/0172365 A1 | 7/2007 | Shimizu et al. |

FOREIGN PATENT DOCUMENTS

| | | |
|---|---|---|
| EP | 1813782 A1 | 8/2007 |
| JP | 6042361 A | 2/1994 |
| JP | 2004132319 A | 4/2004 |
| KR | 1019980087486 A | 12/1998 |

* cited by examiner

SEALING SYSTEM BETWEEN BEARING AND COMPRESSOR HOUSING

FIELD OF THE INVENTION

The invention relates in general to turbochargers and, more particularly, to oil leakage prevention in a turbocharger.

BACKGROUND OF THE INVENTION

Turbochargers can have a turbine wheel that is connected by a shaft to a compressor wheel. The turbine wheel is driven by exhaust gas exiting an internal combustion engine. The rotation of the turbine wheel is communicated to the compressor wheel by the shaft. The compressor wheel is used to increase the pressure of intake air prior to mixing with fuel and combustion in the engine. The speeds at which the shaft, turbine wheel and compressor wheel are rotated is very high, and can be in excess of 60,000 rpm including up to or above 300,000 rpm. Bearings used to support the shaft therefore must be lubricated with pressurized oil. During normal operation of the turbocharger, pressure within the compressor is sufficient to retard the flow of oil from the area of the bearings into the compressor. During certain operational states, pressure is reduced in the compressor and a pressurized oil can be drawn into the compressor area where the oil will contaminate the intake air. Such contaminated air is burned in the engine, generating undesired emissions and potentially damaging certain downstream components. It is therefore necessary to provide appropriate sealing structure to prevent the flow of pressurized oil into the compressor.

There is shown in FIG. 1 a prior art system in which a turbocharger 10 includes a turbine wheel 14, a compressor wheel 18, and a connecting shaft 22. A first bearing 26 and a second bearing 28 can be provided to support the shaft 22. An oil intake 30 communicates with oil passages 34, 38 to deliver oil to the first bearing 26 and the second bearing 28. Additionally, a thrust collar 40 is fixed to and rotates with the shaft 22. The thrust collar 40 includes a first radially outwardly extending wall 44 and a second radially outwardly extending wall 48 (FIG. 2). A thrust bearing 50 has a radially inner end 54 that rests in an annular channel formed by the first radially outwardly extending wall 44 and second radially outwardly extending wall 48 of the thrust collar 40. The thrust bearing 50 controls axially directed movement of the shaft 22.

Lubrication is provided by oil passageway 60 which receives oil from the oil intake 30. Oil escaping from the interface between the first radially outwardly extending wall 44 and the thrust bearing 50 is prevented from reaching the compressor wheel 18 by the provision of a seal assembly including an oil deflector 64 and an insert 68. The deflector 64 has an irregular form to facilitate the drainage of oil. Oil passing the deflector 64 is contacted by an oil thrower 72. The oil thrower 72 is connected to the shaft 22 and rotates therewith. Oil is thrown by the thrower 72 into the chamber 76 where it contacts a deflecting surface 80. The deflecting surface 80 collects the oil and the oil flows gravitationally to the outlet 84. Notwithstanding the presence of the insert 68, oil can flow past the interstices between the insert 68 and the oil thrower 72 to reach the compressor wheel 18. Further, the configuration does not reliably drain oil from the chamber 76.

In U.S. Pat. No. 6,338,614 to LaRue, an annular gland seal is described which attempts to control axially directed thrust imposed on the shaft from the turbine housing shaft end while also attempting to provide a seal between the gland seal and the housing. As shown in FIGS. 3 and 4, the LaRue gland seal 110 has a body 112 having a hollow shaft passage 114 extending axially therethrough from a first body end 116 to a second body end 118. The gland body 112 includes a first diameter section 120 that extends axially a distance away from the first end 116 to a groove 122. The groove 122 is sized and designed to accommodate placement of an annular sealing ring. A second diameter section 124 extends axially from the groove 122 to a shoulder 126 that projects radially outwardly away from the second diameter section.

The shoulder 126 is sized and positioned to interact with an axially projecting section of the compressor backplate. The body 112 includes a flange 128 that is directed radially outwardly away from the shoulder 126 and that is configured to facilitate the passage of oil therethrough via a plurality of radial oil pumping holes 130. The holes 130 are defined axially by a first axial flange surface 132 and an oppositely facing second axial flange surface 134. A third diameter section 136 extends axially from the flange 128 and has a diameter that is greater than both the first and second diameter sections. The third diameter section 126 extends axially to a radially inwardly directed section 138 that is sized to cooperate with a housing member or bearing element within the turbocharger center housing. A fourth diameter section 140 extends axially from the radially inwardly direction section 138 to a radially outwardly flared section 142. The gland body flange 128 and/or radially outwardly flared section 140 are intended to control axially-directed thrust loads that are imposed on the gland by the shaft.

The drawback of the LaRue design is that the flange portion 128 abuts the compressor back plate, but oil is directly supplied via oil pumping holes 130 to the axially projecting section of the backplate that is inserted into shoulder 126. The radially inner portion of oil pumping holes 130 rests directly upon the compressor back plate projection and provides direct access to shoulder 126. As such, the oil is in close proximity to the interstices between the backplate projection and the shoulder 126. This proximity increases the likelihood that the oil will escape through the shoulder 126 and into the compressor.

In U.S. Pat. No. 4,420,160 to Laham, a face seal system is described which attempts to provide a seal between the compressor housing and shaft through use of a biasing mechanism. Referring to FIG. 5, the Laham face seal system 250 has a spring 262 in a recess within the backplate 228 that opens axially toward the interior of the center housing. The recess has an annular flange 266 formed concentrically about and slightly spaced with respect to a spacer 246, and extending axially into the center housing toward a thrust collar 245. The backplate 228 has a plurality of anti-rotation lugs 270 projecting radially inwardly into the recess to form a relatively small annular undercut 271 for reception and positioning of the seal system 250.

A thrust washer 268 has along its periphery a plurality of slots circumferentially arranged for registry with the anti-rotation lugs 270. The spring 262 biases the thrust washer 268 into axial engagement with the anti-rotation lugs 270. A seal member 274 has a plurality of slots 276 configured for registry with the anti-rotation lugs 270. The seal member 274 has an axially presented seal face 278 for bearing and sealing engagement with the rotating thrust collar 245 mounted on the shaft 216 of compressor impeller 212. The seal member 274 also has an opposite axially presented face 279 for bearing engagement with the thrust washer 268. The axial length of the seal member 274 is chosen such that the spring 262 urges the thrust washer 268 into engagement with the face 279 of the seal member 274, which correspondingly urges the sealing face 278 of the seal member 274 into sealing engagement with the thrust collar 245.

An annular resilient seal ring is interposed radially between the backplate flange 266 and the seal member 274 to seal against passage of fluids therebetween. The seal ring is axially positioned between the thrust washer 268 and a radially stepped shoulder formed on the inner diameter of the seal member 274. The thrust washer 268 and the seal ring purportedly combine to adjust the sealing force between the seal face 278 and the thrust collar 245.

The drawback of the Laham design is that the seal member 274 is positioned radially inward of the thrust collar 245 in the region of seal face 278. This positioning creates a reservoir for oil to be in close proximity to any interstices along seal face 278. This proximity increases the likelihood that the oil will escape through the seal face 278 and into the compressor. Additionally, the seal face system 250 relies upon biasing of the seal member 274 against the thrust collar 245. Such an arrangement of face seal system 250 adds cost and is prone to failure over time, especially in the harsh environment of a turbocharger.

Other arrangements have also been used for sealing that suffer from similar drawbacks. In U.S. Pat. No. 5,890,881 to Adeff, additional components at added cost are incorporated into the sealing design in the form of a collar, a ring and a positive face seal. However, the Adeff design positions the positive face seal essentially flush with the ring in the region of the seal face. This arrangement creates a reservoir for oil to be in close proximity to any interstices along the seal face and increases the likelihood that the oil will escape through the seal face and into the compressor.

Thus, there is a need for a turbocharger with an oil discharge or seal assembly that can reduce or eliminate oil leakage. There is a further need for such an assembly and turbocharger that can do so while minimizing complexity and/or cost. There is yet a further need for such an assembly and turbocharger that maintains reliability.

SUMMARY OF THE INVENTION

The present disclosure provides an efficient and cost-effective structure for sealing oil leakage into a compressor of a turbocharger. Under some operating conditions, oil enters the compressor housing due to insufficient shielding of the seal gap. The exemplary embodiments reduce the amount of oil transferring from the bearing housing into the compressor housing. The exemplary embodiments reduce oil consumption and have the added benefit of increasing the life span of downstream components of the turbocharger, such as the engine, particulate filter and/or catalytic converter.

In one aspect, an oil discharge assembly for a turbocharger is provided comprising a thrust collar being generally cylindrical and having a first radially outwardly extending wall and a second radially outwardly extending wall; a thrust bearing having a radially inner end received in the first annular channel; and an insert having an inner axially extending lip with a distal end. The first and second radially outwardly extending walls are axially spaced such that a first annular channel is defined therebetween. The first radially outwardly extending wall has an annular flange that at least in part defines a second annular channel. The distal end is received in the second annular channel. The inner axially extending lip defines an annular drainage channel. The insert annularly surrounds a portion of the thrust collar. The annular drainage channel is radially inward of a radially outermost portion of the second annular channel. An oil collection chamber is defined at least in part by the drainage channel of the insert, the annular flange of the thrust collar and the thrust bearing. The oil collection chamber is in fluid communication with an oil release interface between the thrust collar and the thrust bearing. Pressurized oil can be discharged from the oil release interface and centrifugally propelled towards a radially outer region of the oil collection chamber to collect in the oil collection chamber for subsequent exhaust.

In another aspect, an oil discharge assembly for a turbocharger is provided comprising a thrust collar being generally cylindrical and having a first radially outwardly extending wall and a second radially outwardly extending wall; a thrust bearing having a radially inner end received in the first annular channel; and an insert having an inner axially extending lip with a lip distal end. The first and second radially outwardly extending walls are axially spaced such that a first annular channel is defined therebetween. The first radially outwardly extending wall has a distal end. The lip distal end has a cut-out and the distal end of the first radially outwardly extending wall is received in the cut-out. The inner axially extending lip defines an annular drainage channel. The insert annularly surrounds a portion of the thrust collar. The inner axially extending lip extends only partially along the thrust collar to define a gap between the inner axially extending lip and the thrust bearing. An oil collection chamber is defined at least in part by the drainage channel of the insert, the inner axially extending lip and the thrust bearing. The oil collection chamber is in fluid communication with an oil release interface between the thrust collar and the thrust bearing. The oil release interface is in fluid communication with the gap, whereby pressurized oil discharged from the oil release interface is permitted to be centrifugally propelled towards a radially outer region of the oil collection chamber and to collect in the oil collection chamber for subsequent exhaust.

In another aspect, a method of sealing a compressor housing from a bearing housing in a turbocharger is provided. The method includes, but is not limited to, providing an oil collection chamber in fluid communication with an outlet and in fluid communication with an oil release interface between a thrust collar and a thrust bearing; partially surrounding the thrust collar with an insert to define a seal face therebetween; defining an annular drainage channel in the oil collection chamber, with the annular drainage channel being radially inward of the radially outermost portion of the seal face; discharging pressurized oil from the oil release interface via centrifugal force towards a radially outer region of the oil collection chamber; and exhausting the oil through the outlet of the oil collection chamber.

The first annular channel can open in a radial direction and the second annular channel may open in an axial direction. The thrust collar may have a labyrinth seal and the second annular channel can open in a direction orthogonal to a direction of opening of the labyrinth seal. The second annular channel may have at least two walls that are non-orthogonal to each other. The flange can be positioned along a distal end of the first radially outwardly extending wall. The first radially outwardly extending wall may have an oil deflector extending in a direction towards the thrust bearing.

The thrust bearing can have a thrust bearing channel formed therein and at least a portion of the oil deflector may be received in the thrust bearing channel. The oil deflector can engage at least two surfaces of the thrust bearing channel. The insert may have an outer axially extending lip that engages a bearing housing of the turbocharger. The insert can have an outer axially extending lip that engages the thrust bearing. The oil collection chamber may have a wall with serpentine shape. The oil collection chamber can have a wall along a radial axis.

The thrust collar may have a labyrinth seal. The method can further comprise engaging the insert with at least one of the bearing housing or the thrust bearing. The method may further comprise engaging an oil deflector with the thrust bearing to restrict flow of oil from the oil release interface to the oil collection chamber. The method may further comprise forming an annular channel along the thrust collar that is orthogonal to a labyrinth seal of the thrust collar.

DETAILED DESCRIPTION OF THE INVENTION

Exemplary embodiments described herein are directed to an oil discharge assembly for a turbocharger. Aspects will be explained in connection with several possible embodiments of oil discharge assemblies, but the detailed description is intended only as exemplary. The particular type of turbocharger that utilizes the exemplary embodiments of the oil discharge assemblies described herein can very including, but not limited to, two stage turbocharger configurations and/or low pressure stage turbochargers, single stage turbochargers, variable geometry turbochargers and other types of turbochargers. The exemplary embodiments are shown with cast rear walls. However, the present disclosure contemplates use of the oil discharge assemblies with or without cast rear walls, for example, with bolted rear walls and/or using an oil deflection plate rather than a bearing housing lid. Exemplary embodiments are shown in FIGS. 6-13, but the present disclosure is not limited to the illustrated structure or application.

Figure 1:
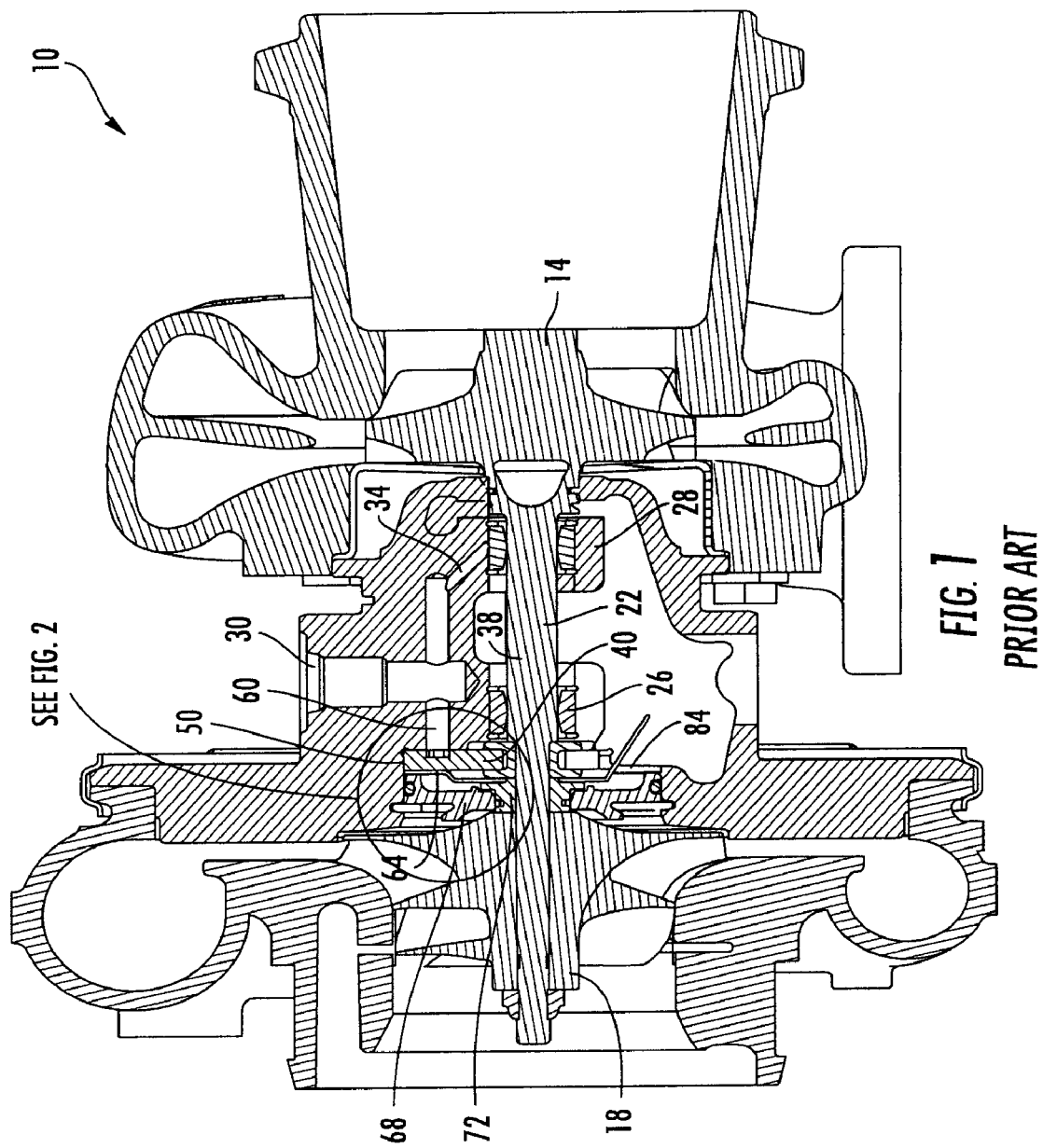
FIG. 1 is a cross-sectional view of a contemporary turbocharger.
Figure 2:
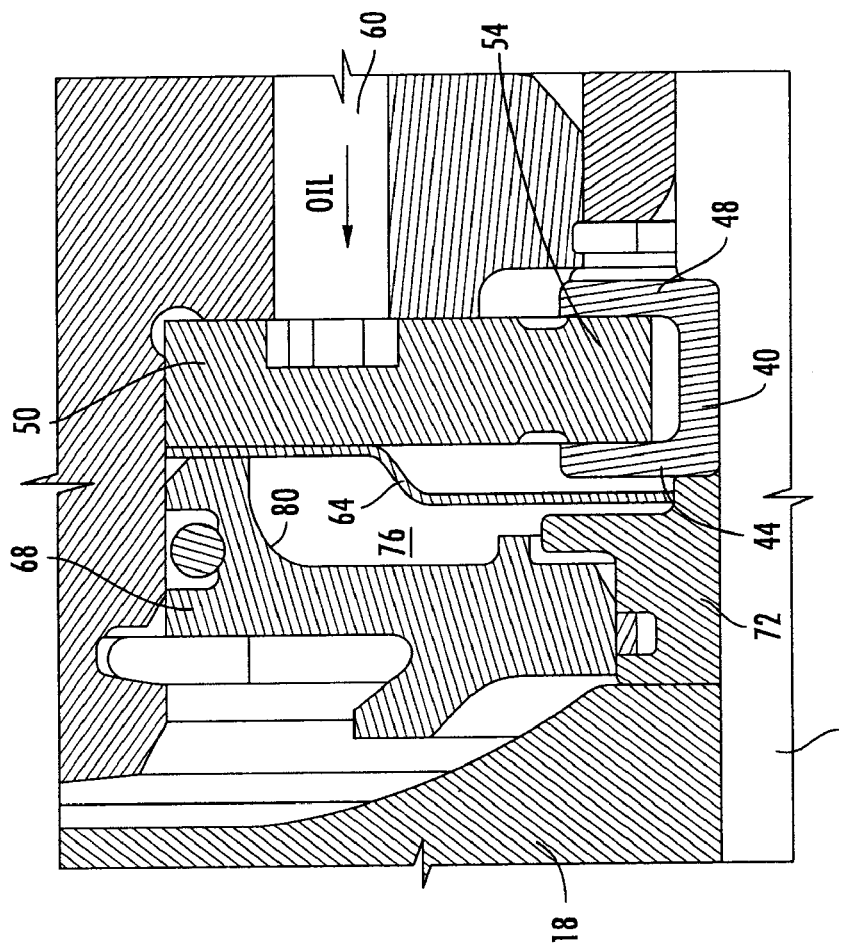
FIG. 2 is an enlarged cross-sectional view of an oil deflector assembly in the turbocharger of FIG. 1.
Figure 3:
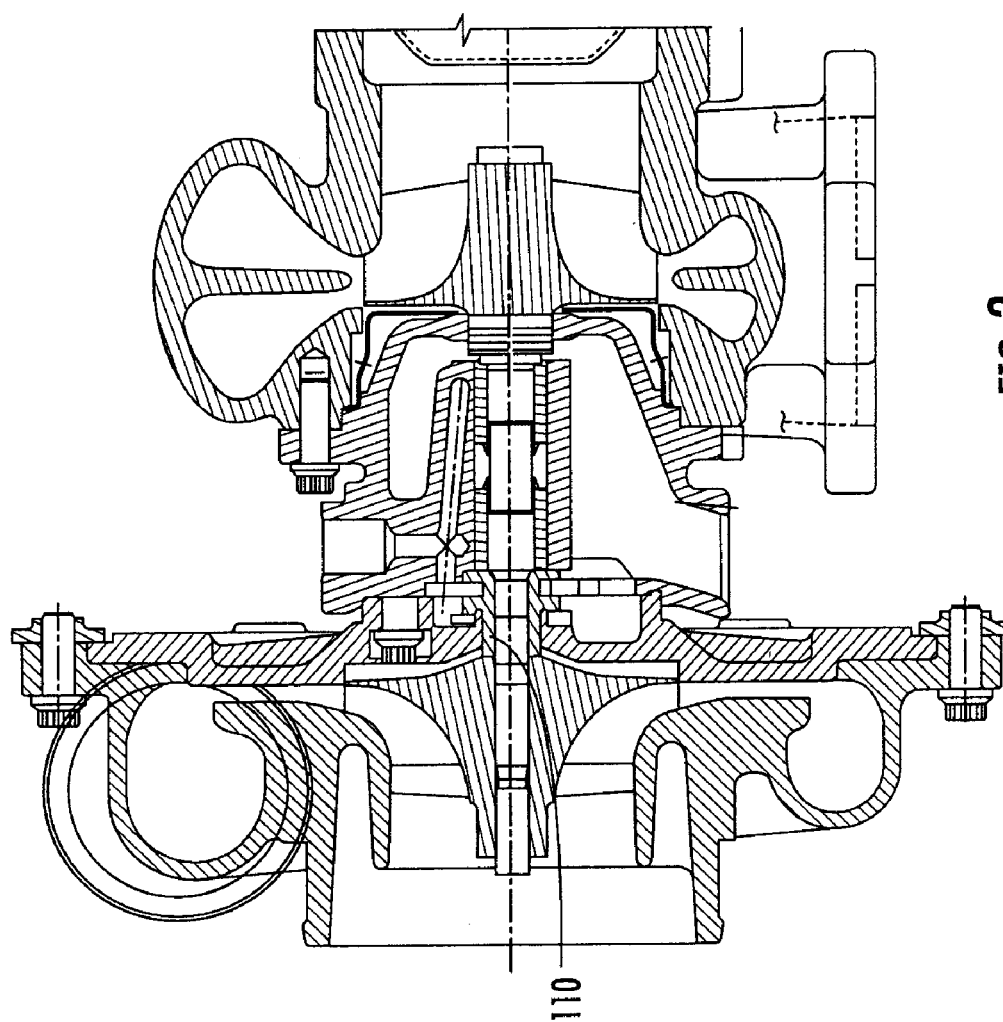
FIG. 3 is a cross-sectional view of a turbocharger according to U.S. Pat. No. 6,338,614.
Figure 4:
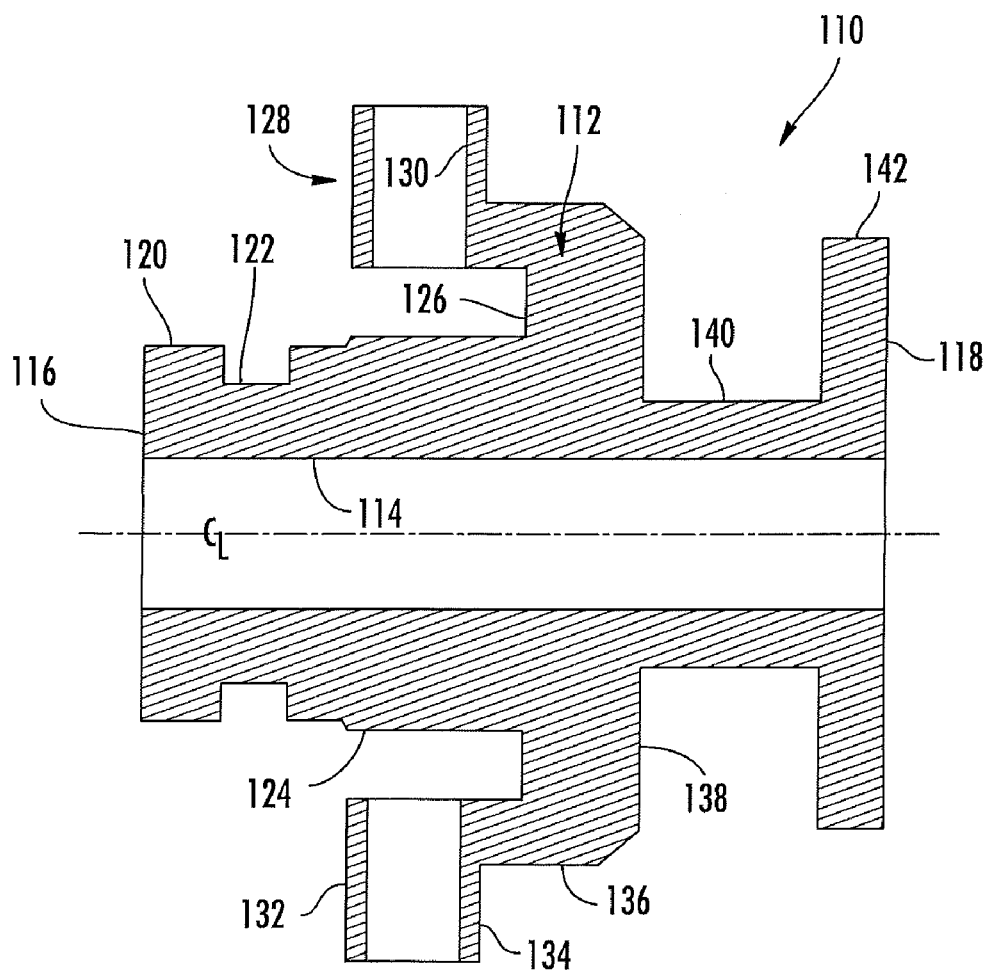
FIG. 4 is an enlarged cross-sectional view of a gland seal in the turbocharger of FIG. 3.
Figure 5:
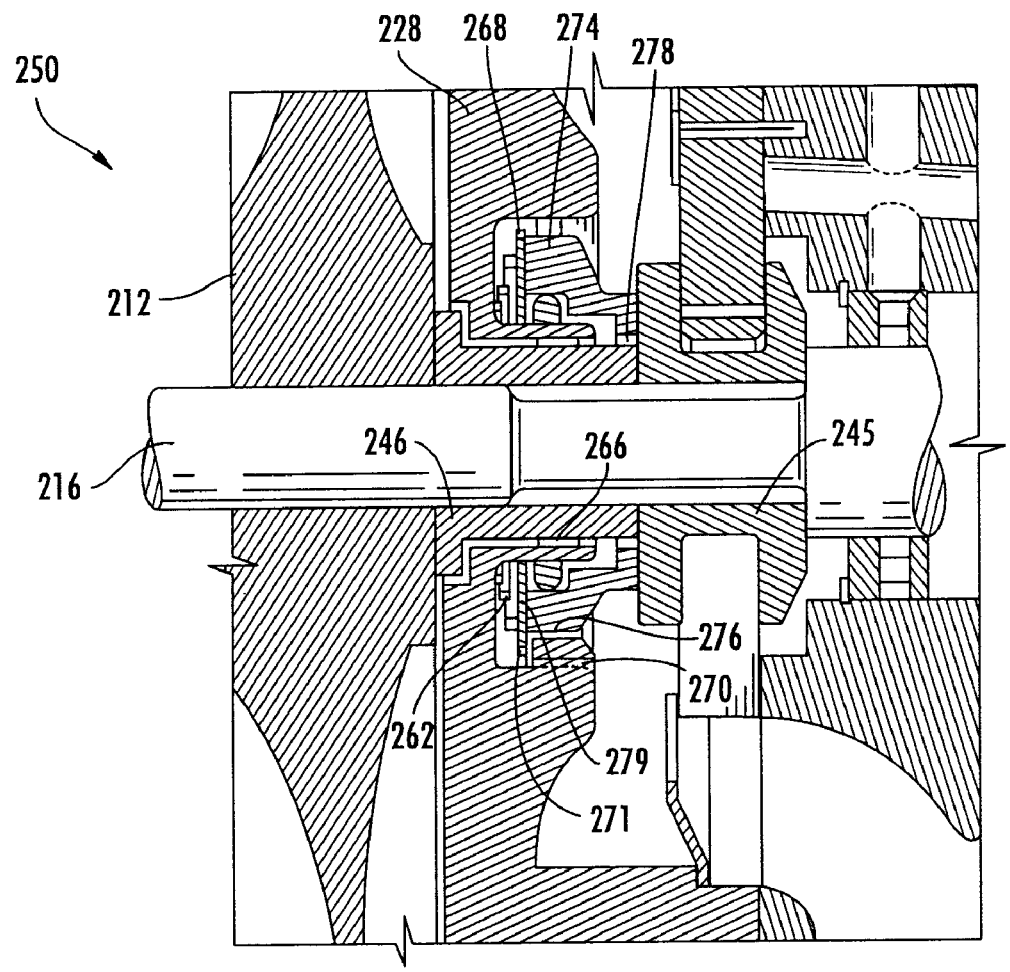
FIG. 5 is a cross-sectional view of a portion of a turbocharger according to U.S. Pat. No. 4,420,160.
Figure 6:
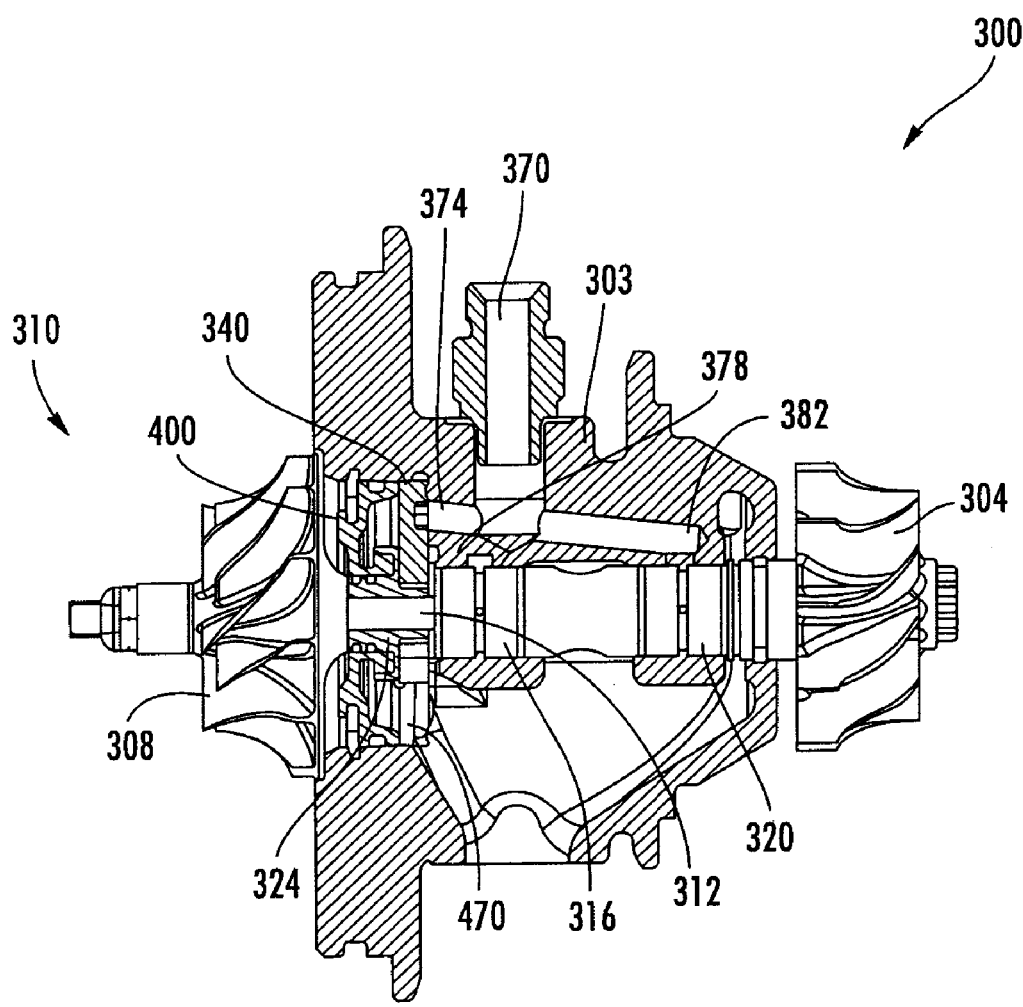
FIG. 6 is a cross-sectional view of a turbocharger with an oil discharge assembly according to an exemplary embodiment of the invention.
Figure 7:
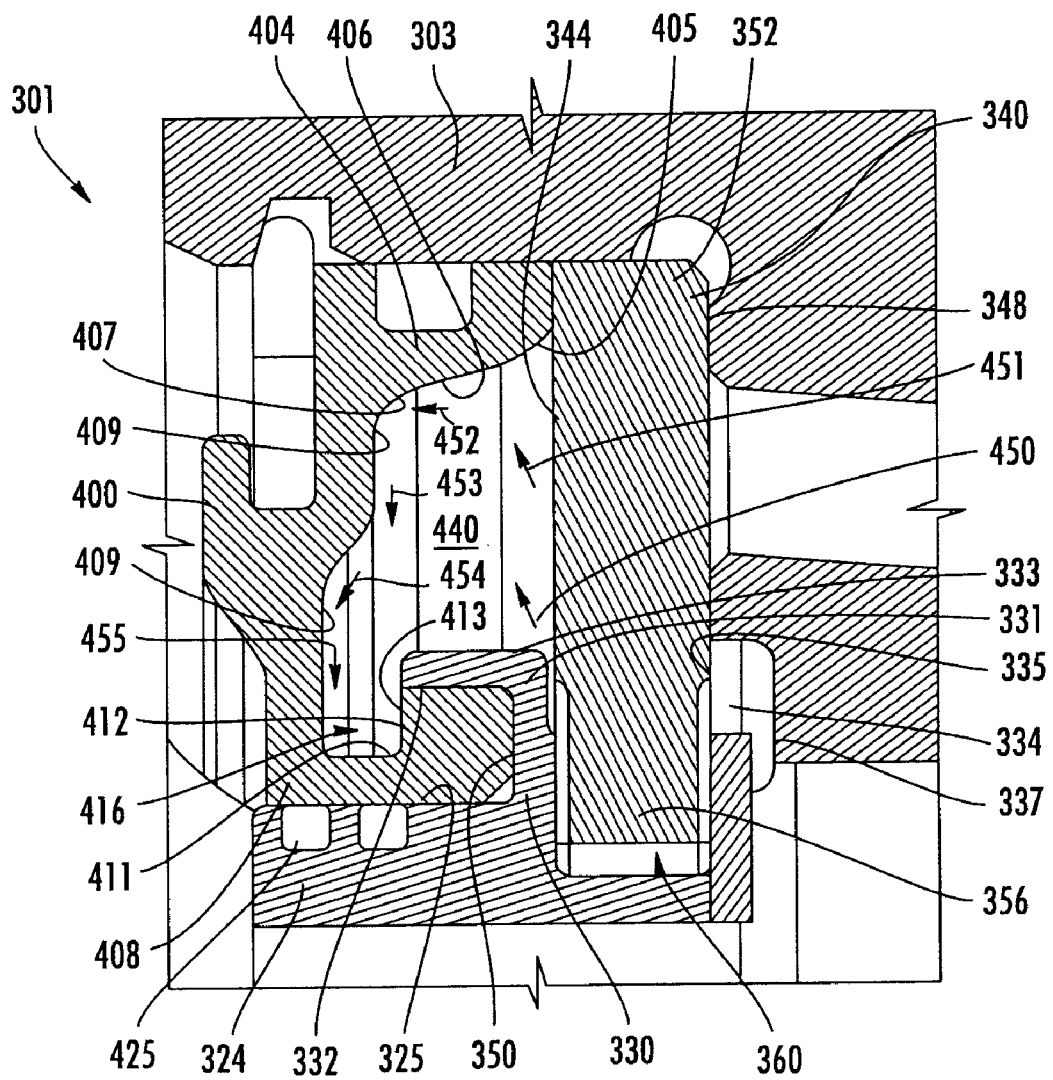
FIG. 7 is an enlarged cross-sectional view of a portion of the turbocharger with the oil discharge assembly of FIG. 6.

Referring to FIGS. 6 and 7, an oil discharge assembly is shown and generally referred to by reference numeral 301, which can be used in a turbocharger 300. It should be understood that not all of the components of turbocharger 300 are shown but that the present disclosure contemplates the use of various components with the turbocharger. Turbocharger 300 has a center or bearing housing 303, a turbine housing, and a compressor housing. The turbocharger can include a turbine wheel 304 and a compressor wheel 308 that are connected by a shaft 312. The compressor wheel 308 can be provided in a compressor assembly 310. The shaft 312 is supported by a first journal bearing 316 and a second journal bearing 320.

The turbocharger 300 can have a thrust collar 324 that is generally cylindrical with a radially outer surface 325, a first radially outwardly extending wall 330 and a second radially outwardly extending wall 334. The first radially outwardly extending wall 330 has a flange 331 with a proximal face 332 and a distal face 333. The flange 331 is preferably continuous along the first radially outwardly extending wall 330 and is preferably along a radially outer extent or distal end of the first radially outwardly extending wall. The proximal face 332 of flange 331 and the radially outer surface 325 are radially spaced such that an annular channel 350 is defined therebetween.

The second radially outwardly extending wall 334 has a proximal face 335 and a distal face 337. It should be noted that the terms "proximal" and "distal," as used herein, are intended to mean relative to the compressor assembly 310 or the shaft 312. The first and second radially outwardly extending walls 330, 334 are axially spaced such that an annular channel 360 is defined therebetween. The annular channel 360 can be defined in part by the first radially outwardly extending wall 330 and the proximal face 335 of the second radially outwardly extending wall 334.

The turbocharger 300 can have a thrust bearing 340. The thrust bearing 340 has a first axial face 344 and a second axial face 348. The thrust bearing 340 has a radially outer end 352 and a radially inner end 356. At least a portion of the thrust bearing 340, including the radially inner end 356, can be received in the annular channel 360 for absorbing vibration and controlling axial movement.

Pressurized oil can be provided through an oil intake 370 and through a passageway 374 to the thrust bearing 340. Oil is transported through a passageway 378 to the first journal bearing 316 and through a passageway 382 to the second journal bearing 320. Oil making its way toward the compressor 310 is blocked by an insert 400. The insert 400 is generally annular and has an outer axially extending lip 404 and an inner axially extending lip 408. The inner lip 408 has a radially outwardly extending tip 412 such that the inner lip 408 defines an annular drainage channel 416. The radially outwardly extending tip 412 is preferably of increased width or diameter as compared to the rest of the inner lip 408. The insert 400 can be made of any suitable material, such as iron.

The insert 400 annularly surrounds at least a portion of the thrust collar 324. At least a portion of the outer lip 404 of the insert 400 can directly engage the housing 303. Preferably, the outer lip 404 directly engages the proximal face 344 of the thrust bearing 340 near the radially outer end 352. At least a portion of the radially outwardly extending tip 412 can be positioned in the annular channel 350. The tip 412 can have chamfered or tapered edges to facilitate assembly of the tip into the annular channel 350. The tip 412 of the inner lip 408 preferably directly engages the proximal face 332 of the flange 331, as well as the other faces of the annular channel 350. More preferably, the entire radially outwardly extending tip 412 is positioned in the annular channel 350 so as to completely or substantially fill the annular channel.

An oil collection chamber 440 is defined at least in part by the drainage channel 416 of the insert 400, the flange 331 of the thrust collar 328 and the first axial face 344 of the thrust bearing 340. The chamber 440 is in fluid communication with an oil release interface between the first radially outwardly extending wall 330 and the first axial face 344 of the thrust bearing 340.

Oil discharged from the oil release interface is centrifugally propelled from the interface as generally indicated by arrow 450. The oil can be propelled toward a radially outer region of the oil collection chamber 440 as indicated by arrow 451. The oil can strike a deflecting surface 406 of the insert 400 and can follow the path of arrows 452-455 to the drainage channel 416. The deflecting surface 406 can be contoured to generally direct the oil radially inward and/or downward. The deflecting surface 406 can be substantially curvilinear, serpentine or otherwise smooth. However, the present disclosure contemplates the use of other shapes and contours including an angular deflecting surface 406. The deflecting surface 406 can include an upper deflecting surface 405, a radially inwardly angled surface 407, one or more proximal walls 409 that can be substantially radially straight, a base 411, and a distal wall 413. Oil collected in the collection chamber 416 can flow gravitationally to an outlet 470, where the oil can be returned to a sump or reservoir or otherwise exits the turbocharger assembly 300.

According to aspects of the invention, an enlarged chamber 440 is preferred. The larger the chamber 440, the more difficult it is for oil to stick between two surfaces of the chamber. Thus, the likelihood that the oil will drain out of the oil collection chamber 440 can be increased. To facilitate the seal between the thrust collar 324 and the insert 400, the thrust collar 400 can be provided with labyrinth seals 425. The particular shape, size, configuration and number of labyrinth seals 425 can be chosen to improve the sealing. The present disclosure also contemplates the use of other seals along with, or instead of, the labyrinth seals 425, such as piston rings and the like, that may be positioned in grooves formed along the thrust collar 324 and/or the insert 400.

The seal face formed between the thrust collar 324 and the insert 400 is along three faces (proximal face 332, wall 330 and wall 325). The radial channel 416 is radially inward of the beginning of the seal face or first of the three faces. By recessing or providing the radial channel 416 radially inward from the beginning or first of the three faces, oil is positioned remote to the interstices in the seal face. The oil can follow the path described above with respect to arrows 450-455 and can be returned to the sump or reservoir through outlet 470. This remoteness decreases the likelihood that the oil will escape through the seal face between the thrust collar 324 and the insert 400, and into the compressor. Additionally, the insertion of the tip 412 of insert 400 into annular channel 350 allows for the formation of a better seal to prevent leakage through the seal face. The seal face length is also increased through use of the insertion of the tip 412 of insert 400 into annular channel 350.

The seal face formed by the insertion of the tip 412 of insert 400 into annular channel 350 also increases the length of the seal labyrinth which can be used in combination with labyrinth seals 425. The labyrinth formed by annular channel 350 is in a different direction from the labyrinth of seals 425, i.e., annular channel 350 opens in an axial direction while seals 425 open in a radial direction. Such a configuration of labyrinths opening in more than one direction, e.g., labyrinths orthogonal to each other, further reduces the likelihood of leakage of oil into the compressor.

Figure 8:
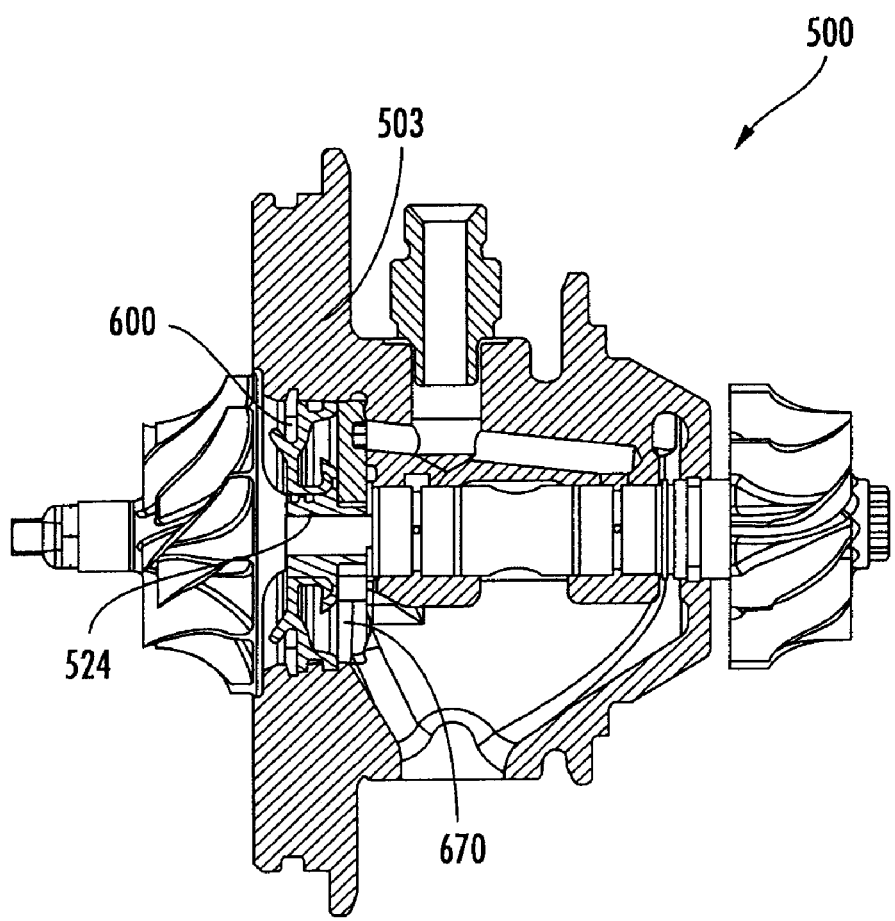
FIG. 8 is a cross-sectional view of a turbocharger with an oil discharge assembly according to another exemplary embodiment of the invention.
Figure 9:
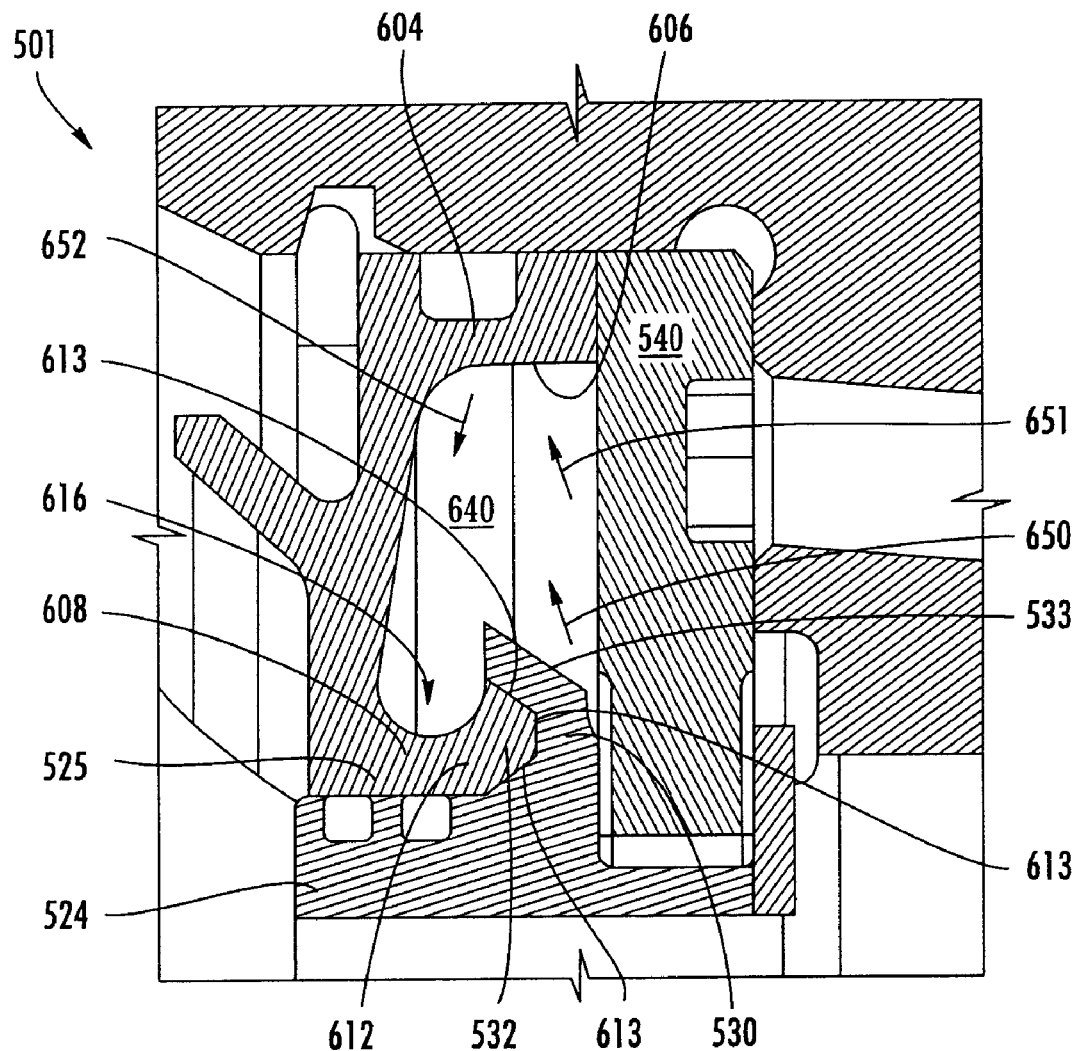
FIG. 9 is an enlarged cross-sectional view of a portion of the turbocharger with the oil discharge assembly of FIG. 8.

Referring to FIGS. 8 and 9, another exemplary embodiment of an oil discharge assembly is shown and generally referred to by reference numeral 501, which can be used in a turbocharger 500. It should be understood that not all of the components of turbocharger 500 are shown but that the present disclosure contemplates the use of various components with the turbocharger. Turbocharger 500 has many features similar to that of turbocharger 300 of FIGS. 6 and 7, the description of which will not be repeated.

The turbocharger 500 can have a thrust collar 524 that is generally cylindrical with a radially outer surface 525 and a first radially outwardly extending wall 530. The first radially outwardly extending wall 530 has a proximal face 532 and a distal face 533. It should be noted that the terms "proximal" and "distal," as used herein, are intended to mean relative to the compressor assembly or the shaft.

The insert 600 is generally annular and has an outer axially extending lip 604 and an inner axially extending lip 608. The inner lip 608 has a radially outwardly extending tip 612 such that the inner lip 608 defines an annular drainage channel 616. The radially outwardly extending tip 612 is preferably of increased width or diameter as compared to the rest of the inner lip 608. The insert 600 can be made of any suitable material, such as iron.

The insert 600 annularly surrounds at least a portion of the thrust collar 524. At least a portion of the outer lip 604 of the insert 600 can directly engage the housing 503. The radially outwardly extending tip 612 preferably has at least three faces 613 that abut against, and engage with, corresponding faces along proximal face 532. The corresponding faces are preferably of the same angles and dimensions to facilitate a sealing engagement therewith.

An oil collection chamber 640 is defined at least in part by the drainage channel 616, the wall 530 and the thrust bearing 540. The chamber 640 is in fluid communication with an oil release interface between the first radially outwardly extending wall 530 and thrust bearing 540.

Oil discharged from the oil release interface is centrifugally propelled from the interface as generally indicated by arrow 650. The oil can be propelled toward a radially outer region of the oil collection chamber 640 as indicated by arrow 651. The oil can strike a deflecting surface 606 of the insert 600 and can follow the path of arrow 652 to the drainage channel 616. The deflecting surface 606 can be contoured to generally direct the oil radially inward and/or downward. The deflecting surface 606 can be substantially curvilinear, serpentine or otherwise smooth. However, the present disclosure contemplates the use of other shapes and contours including an angular deflecting surface 606. Oil collected in the collection chamber 616 can flow gravitationally to an outlet 670, where the oil can be returned to a sump or reservoir or otherwise exits the turbocharger assembly 500.

The seal face formed between the thrust collar 524 and the insert 600 is along three faces 613 which are offset at an angle to each other. The present disclosure contemplates the use of more than three faces 613 along the seal face between the thrust collar 524 and the insert 600. The radial channel 616 is radially inward of the beginning of the seal face or first of the three faces 613. By recessing or providing the radial channel 616 radially inward from the beginning or first of the three faces 613, oil is positioned remote to the interstices in the seal face. The oil can follow the path described above with respect to arrows 650-652 and can be returned to the sump or reservoir through outlet 670. This remoteness decreases the likelihood that the oil will escape through the seal face between the thrust collar 624 and the insert 600, and into the compressor. The seal face is also lengthened by the use of faces 613 which provides more surface area for effective sealing. Additionally, the use of angled faces 613 allows for thermal expansion of the tip 612 of insert 600 which can slide along the outer faces while maintaining a seal.

Figure 10:
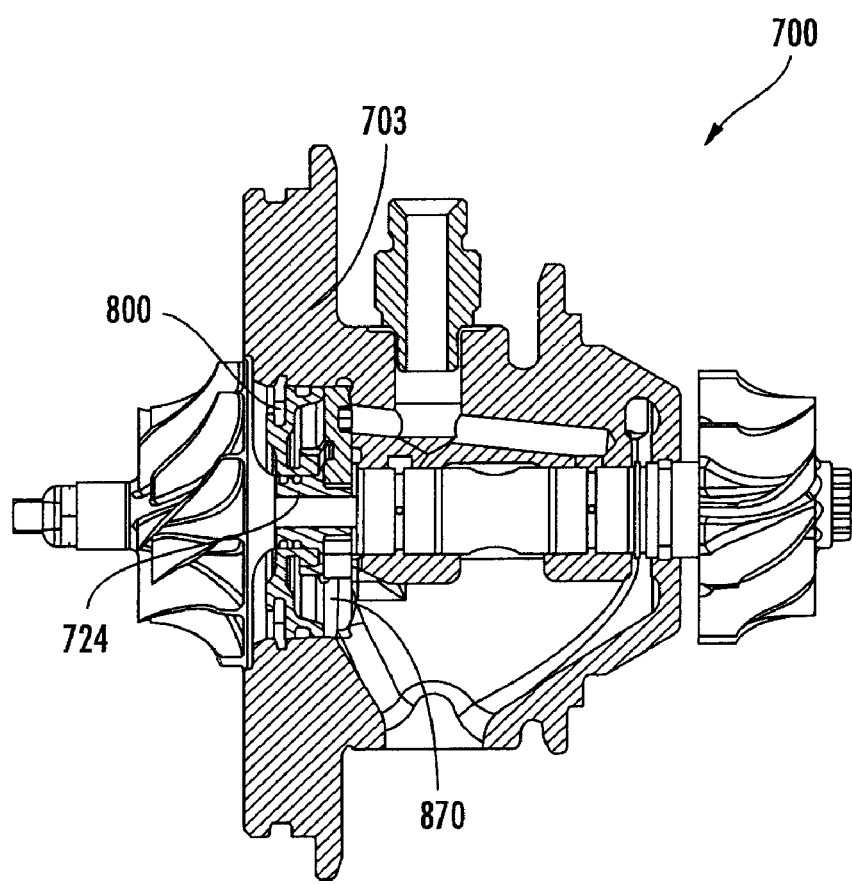
FIG. 10 is a cross-sectional view of a turbocharger with an oil discharge assembly according to another exemplary embodiment of the invention.
Figure 11A:
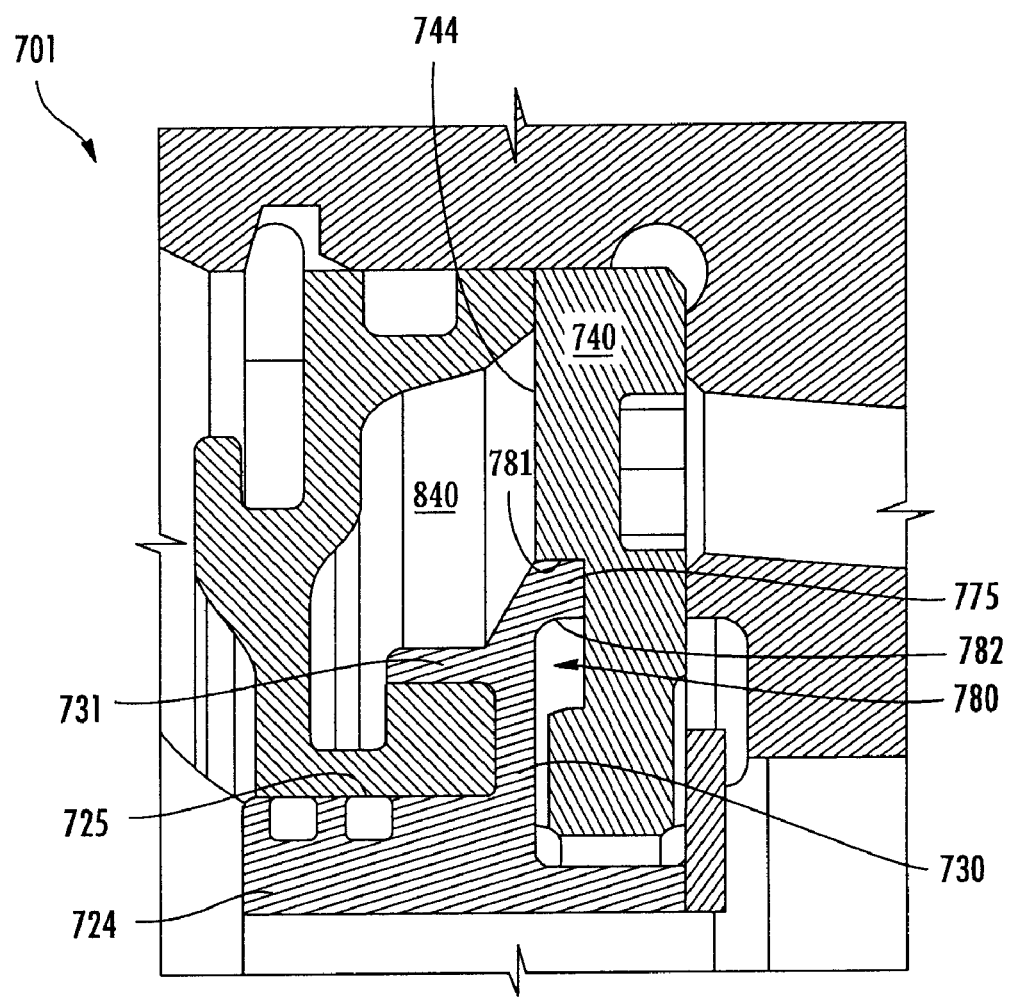
FIG. 11a is an enlarged cross-sectional view of a portion of the turbocharger with the oil discharge assembly of FIG. 10.

Referring to FIGS. 10 and 11*a*, an oil discharge assembly is shown and generally referred to by reference numeral 701, which can be used in a turbocharger 700. It should be understood that not all of the components of turbocharger 700 are shown but that the present disclosure contemplates the use of various components with the turbocharger. Turbocharger 700 has many features similar to that of turbocharger 300 of FIGS. 6 and 7, the description of which will not be repeated. Turbocharger 700 has a center or bearing housing 703, a turbine housing, a compressor housing and an outlet 870.

The turbocharger 700 can have a thrust collar 724 that is generally cylindrical with a radially outer surface 725 and a first radially outwardly extending wall 730. The first radially outwardly extending wall 730 has a flange 731 similar to flange 331 with respect to the exemplary embodiment of FIGS. 6 and 7. However, oil discharge assembly 700 also has an oil deflector 775 that can abut against or be coupled with the insert 800. The oil deflector 775 is preferably continuous along the first radially outwardly extending wall 730 and is preferably along a radially outer extent of the first radially outwardly extending wall. Oil deflector 775 can extend in a direction opposite to the direction of flange 731. The present disclosure also contemplates the oil deflector 775 and flange 731 being positioned at the same radial position along wall 730 to form a T-like structure.

The oil deflector 775 engages with a channel 780 formed along the first axial face 744 of the thrust bearing 740. The engagement of the oil deflector 775 with the channel 780 reduces the transfer of oil into chamber 840. Such a reduction of oil transfer reduces the amount of oil that leaks into the compressor. The particular engagement of the oil deflector 775 with the channel 780 can be chosen to control the amount of oil transfer. For example, as shown in FIG. 11*a*, the oil deflector 775 can engage the channel 780 along faces 781 and 782 of the channel. However, the present disclosure contemplates other engagement structures and configurations including, but not limited to, engagement of the oil deflector 775 with the channel 780 along one or three or more walls of the channel. The oil deflector 775 and sealing against two faces 781 and 782 assists in deflecting the oil back into the channel 780.

Figure 11B:
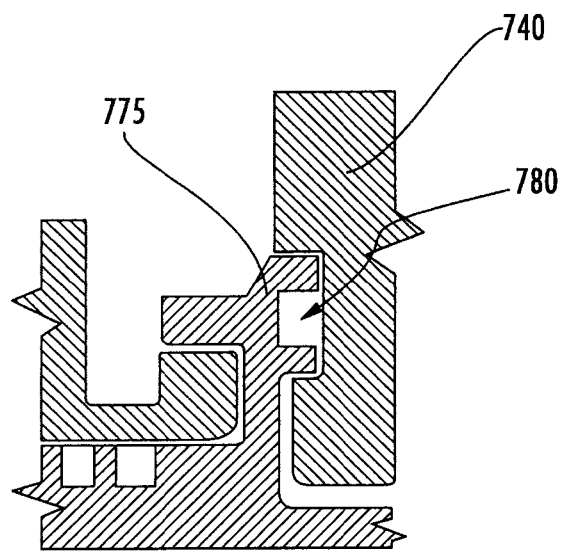
FIG. 11b is an enlarged cross-sectional view of a portion of the turbocharger with the oil discharge assembly of FIG. 10 and another exemplary embodiment of an oil deflector.
Figure 11C:
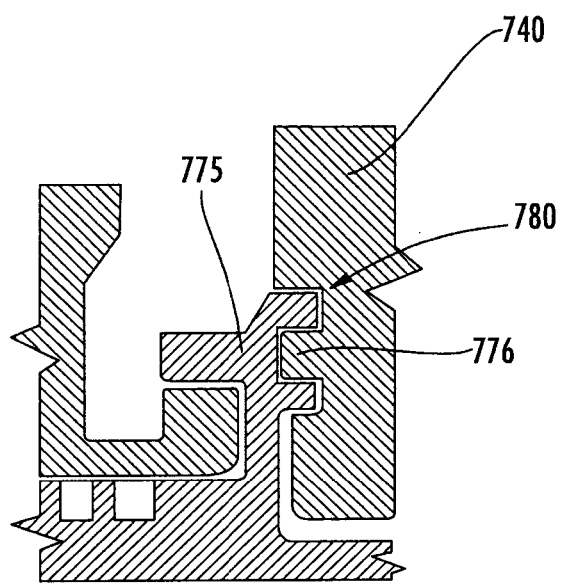
FIG. 11c is an enlarged cross-sectional view of a portion of the turbocharger with the oil discharge assembly of FIG. 10 and another exemplary embodiment of an oil deflector.

The present disclosure also contemplates other shapes, configurations and engagement structures/techniques between the oil deflector 775 and the channel 780. For example, as shown in FIG. 11*b*, the oil deflector 775 can have a U-like structure that opens in the direction of the channel 780. A U-like deflector 775 can have ends that are inserted into the channel 780. The channel 780 can also have other structures that provide for engagement with the U-like deflector 775 such as shown in FIG. 11*c* where a projection 776 extending from bearing 740 is inserted between the ends of the U-like deflector. Such an arrangement further increases the labyrinth seal between the oil deflector 775 and the thrust bearing 740 and provides for a large number of sealing faces between the oil deflector and thrust bearing.

Figure 12:
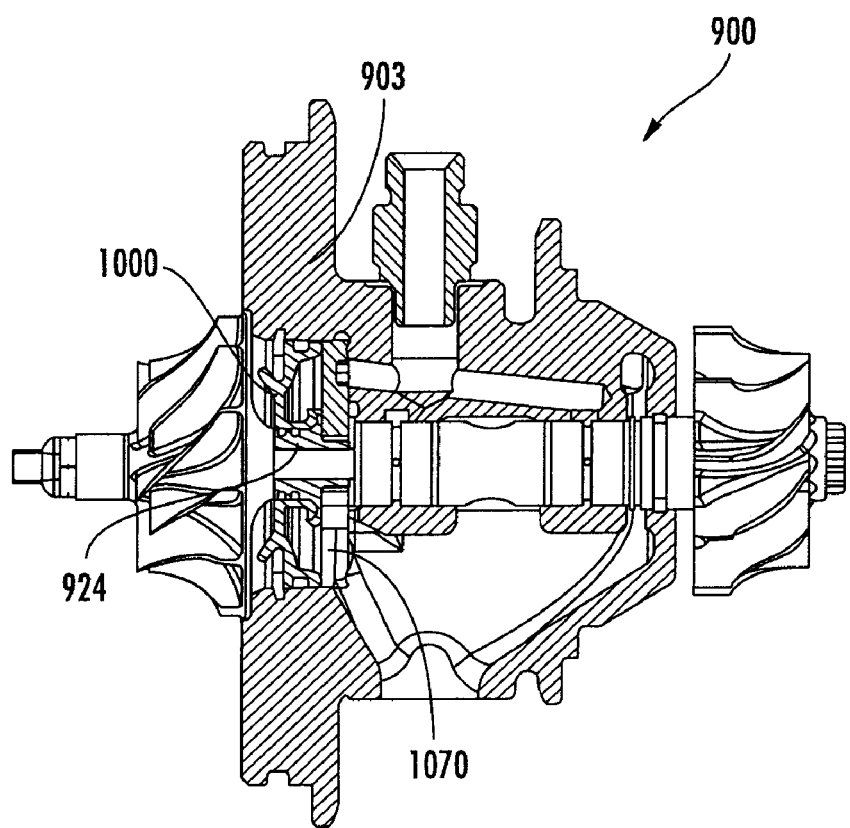
FIG. 12 is a cross-sectional view of a turbocharger with an oil discharge assembly according to another exemplary embodiment of the invention.
Figure 13:
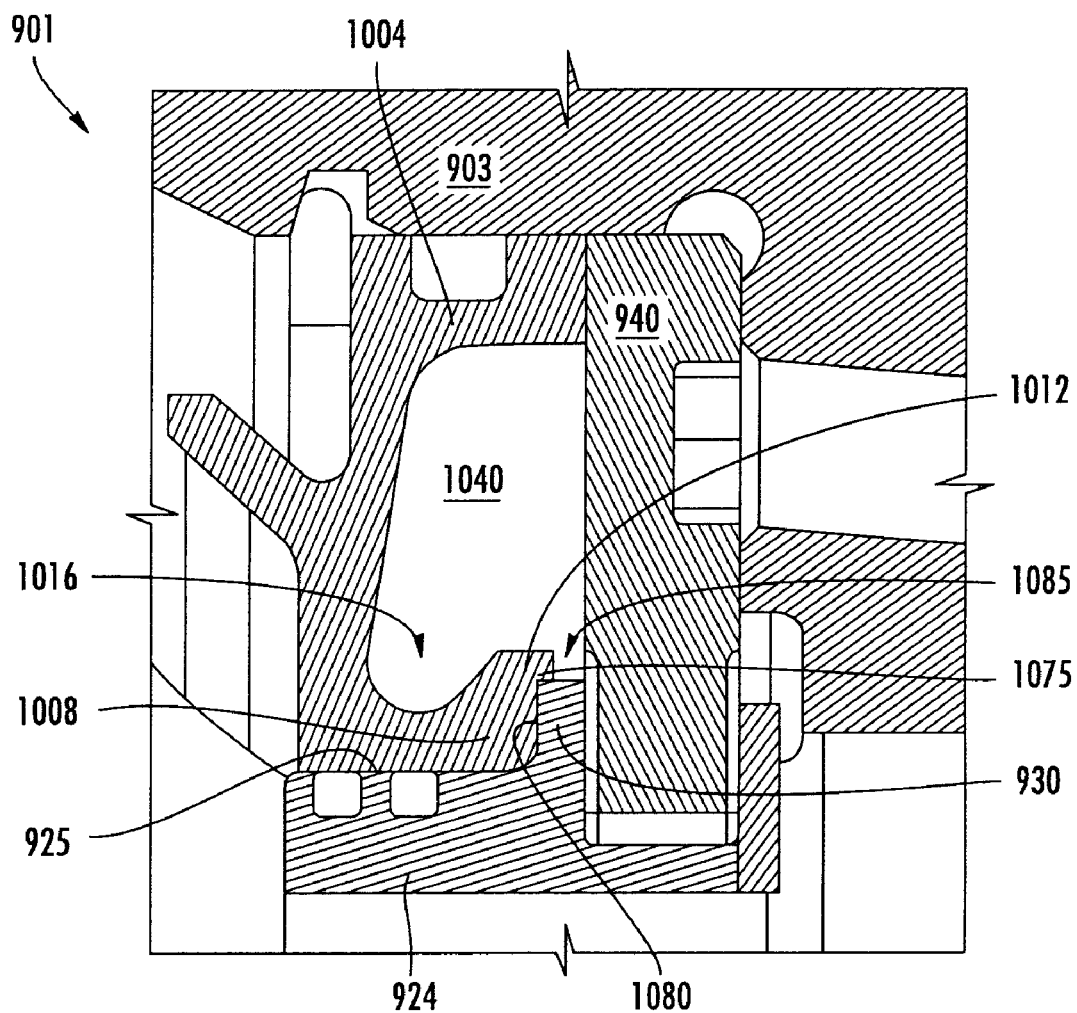
FIG. 13 is an enlarged cross-sectional view of a portion of the turbocharger with the oil discharge assembly of FIG. 12.

Referring to FIGS. 12 and 13, an oil discharge assembly is shown and generally referred to by reference numeral 901, which can be used in a turbocharger 900. It should be understood that not all of the components of turbocharger 900 are shown but that the present disclosure contemplates the use of various components with the turbocharger. Turbocharger 900 has many features similar to that of turbocharger 300 of FIGS. 6 and 7, the description of which will not be repeated. Turbocharger 900 has a center or bearing housing 903, a turbine housing, a compressor housing and an outlet 1070.

The turbocharger 900 can have a thrust collar 924 that is generally cylindrical with a radially outer surface 925 and a first radially outwardly extending wall 930. The insert 1000 is generally annular and has an inner axially extending lip 1008. The inner lip 1008 has a radially outwardly extending tip 1012 such that the inner lip 1008 defines an annular drainage channel 1016. The radially outwardly extending tip 1012 is preferably of increased width or diameter as compared to the rest of the inner lip 1008. The insert 1000 can be made of any suitable material, such as iron.

The insert 1000 annularly surrounds at least a portion of the thrust collar 924. At least a portion of the outer lip 1004 of the insert 1000 can directly engage the housing 903. The distal end 1075 of the tip 1012 has a cut-out 1080 therein. The cut-out 1080 is sized and shaped to engage the wall 930 of thrust collar 924. The tip 1012 extends only partially along the radially outer surface 925 of the thrust collar 924 so that a gap 1085 is defined between the tip and the thrust bearing 940.

The chamber 1040 is in fluid communication with an oil release interface between the first radially outwardly extending wall 930 and the thrust bearing 1040. The gap 1085 facilitates movement of the oil from the oil release interface (between wall 930 and thrust bearing 940), past the seal face formed between the cut-out 1080 of tip 1012 and the wall 930 of thrust collar 924, into the chamber 1040, into the drainage channel 1016 and out through the outlet 1070.

It should be understood that features of the various exemplary embodiments can be interchangeable with one another. It should further be understood that other sealing structures and techniques can be used in combination with the exemplary embodiments described herein, such as the use of an interstice sealing to further enhance the ability to seal against oil leakage into the compressor from the bearing housing.

The foregoing description is provided in the context of exemplary embodiments of oil discharge assemblies for a turbocharger. Thus, it will of course be understood that the invention is not limited to the specific details described herein, which are given by way of example only, and that various modifications and alterations are possible within the scope of the invention as defined in the following claims.

What is claimed is:

1. An oil discharge assembly (301, 501, 701, 901) for a turbocharger (300, 500, 700, 900) comprising:
   a thrust collar (324, 524, 724, 924) being generally cylindrical and having a first radially outwardly extending wall and a second radially outwardly extending wall, the first and second radially outwardly extending walls being axially spaced such that a first annular channel is defined therebetween, the first radially outwardly extending wall having an annular flange that at least in part defines a second annular channel;
   a thrust bearing (340, 540, 740, 940) having a radially inner end received in the first annular channel; and
   an insert (400, 600, 800, 1000) having an inner axially extending lip with a distal end,
   wherein the distal end is received in the second annular channel, the inner axially extending lip defining an annular drainage channel, the insert (400, 600, 800, 1000) annularly surrounding a portion of the thrust collar (324, 524, 724, 924), the annular drainage channel being radially inward of a radially outermost portion of the second annular channel, wherein an oil collection chamber (440, 640, 840, 1040) is defined at least in part by the drainage channel of the insert (400, 600, 800, 1000), the annular flange of the thrust collar (324, 524, 724, 924) and the thrust bearing (340, 540, 740, 940), and wherein the oil collection chamber (440, 640, 840, 1040) is in fluid communication with an oil release interface between the thrust collar (324, 524, 724, 924) and the thrust bearing (340, 540, 740, 940), whereby pressurized oil discharged from the oil release interface is directed towards a radially outer region of the oil collection chamber (440, 640, 840, 1040) and is collected in the oil collection chamber (440, 640, 840, 1040) for subsequent exhaust.

2. The assembly (301, 501, 701, 901) of claim 1, wherein the first annular channel opens in a radial direction and wherein the second annular channel opens in an axial direction.

3. The assembly (301, 501, 701, 901) of claim 1, wherein the thrust collar (324, 524, 724, 924) has a labyrinth seal and wherein the second annular channel opens in a direction orthogonal to a direction of opening of the labyrinth seal.

4. The assembly (301, 501, 701, 901) of claim 1, wherein the second annular channel has at least two adjacent walls that are non-orthogonal to each other.

5. The assembly (301, 501, 701, 901) of claim 1, wherein the annular flange is along a distal end of the first radially outwardly extending wall.

6. The assembly (301, 501, 701, 901) of claim 1, wherein the first radially outwardly extending wall has an oil deflector extending in a direction toward the thrust bearing (340, 540, 740, 940).

7. The assembly (301, 501, 701, 901) of claim 1, wherein the thrust bearing (340, 540, 740, 940) has a thrust bearing (340, 540, 740, 940) channel formed therein and wherein at least a portion of the oil deflector is received in the thrust bearing (340, 540, 740, 940) channel.

8. The assembly (301, 501, 701, 901) of claim 7, wherein the oil deflector engages at least two surfaces of the thrust bearing (340, 540, 740, 940) channel.

9. The assembly (301, 501, 701, 901) of claim 1, wherein the insert (400, 600, 800, 1000) has an outer axially extending lip that engages a bearing housing of the turbocharger (300, 500, 700, 900).

10. The assembly (301, 501, 701, 901) of claim 1, wherein the insert (400, 600, 800, 1000) has an outer axially extending lip that engages the thrust bearing (340, 540, 740, 940).

11. The assembly (301, 501, 701, 901) of claim 1, wherein the oil collection chamber (440, 640, 840, 1040) has a wall with a serpentine shape.

12. The assembly (301, 501, 701, 901) of claim 1, wherein the oil collection chamber (440, 640, 840, 1040) has a wall along a radial axis.

13. An oil discharge assembly (301, 501, 701, 901) for a turbocharger (300, 500, 700, 900) comprising:

a thrust collar (324, 524, 724, 924) being generally cylindrical and having a first radially outwardly extending wall and a second radially outwardly extending wall, the first and second radially outwardly extending walls being axially spaced such that a first annular channel is defined therebetween, the first radially outwardly extending wall having a distal end;

a thrust bearing (340, 540, 740, 940) having a radially inner end received in the first annular channel; and an insert (400, 600, 800, 1000) having an inner axially extending lip with a lip distal end, wherein the lip distal end has a cut-out and the distal end of the first radially outwardly extending wall is received in the cut-out, the inner axially extending lip defining an annular drainage channel, the insert (400, 600, 800, 1000) annularly surrounding a portion of the thrust collar (324, 524, 724, 924), the inner axially extending lip extending only partially along the thrust collar (324, 524, 724, 924) to define a gap between the inner axially extending lip and the thrust bearing (340, 540, 740, 940), wherein an oil collection chamber (440, 640, 840, 1040) is defined at least in part by the drainage channel of the insert (400, 600, 800, 1000), the inner axially extending lip and the thrust bearing (340, 540, 740, 940), wherein the oil collection chamber (440, 640, 840, 1040) is in fluid communication with an oil release interface between the thrust collar (324, 524, 724, 924) and the thrust bearing (340, 540, 740, 940), the oil release interface being in fluid communication with the gap, whereby pressurized oil discharged from the oil release interface is centrifugally propelled towards a radially outer region of the oil collection chamber (440, 640, 840, 1040) and is collected in the oil collection chamber (440, 640, 840, 1040) for subsequent exhaust.

14. The assembly (301, 501, 701, 901) of claim 13, wherein the thrust collar (324, 524, 724, 924) has a labyrinth seal.

15. The assembly (301, 501, 701, 901) of claim 13, wherein the insert (400, 600, 800, 1000) has an outer axially extending lip that engages a bearing housing of the turbocharger (300, 500, 700, 900).

16. The assembly (301, 501, 701, 901) of claim 13, wherein the insert (400, 600, 800, 1000) has an outer axially extending lip that engages the thrust bearing (340, 540, 740, 940).

17. A method of sealing a compressor housing from a bearing housing in a turbocharger (300, 500, 700, 900), the method comprising:

providing an oil collection chamber (440, 640, 840, 1040) in fluid communication with an outlet and in fluid communication with an oil release interface between a thrust collar (324, 524, 724, 924) and a thrust bearing (340, 540, 740, 940);

partially surrounding the thrust collar (324, 524, 724, 924) with an insert (400, 600, 800, 1000) to define a seal face therebetween;

defining an annular drainage channel in the oil collection chamber (440, 640, 840, 1040), the annular drainage channel being radially inward of the radially outermost portion of the seal face;

discharging pressurized oil from the oil release interface via centrifugal force towards a radially outer region of the oil collection chamber (440, 640, 840, 1040); and exhausting the oil through the outlet of the oil collection chamber (440, 640, 840, 1040).

18. The method of claim 17, further comprising engaging the insert (400, 600, 800, 1000) with at least one of the bearing housing or the thrust bearing (340, 540, 740, 940).

19. The method of claim 17, further comprising engaging an oil deflector with the thrust bearing (340, 540, 740, 940) to restrict flow of oil from the oil release interface to the oil collection chamber (440, 640, 840, 1040).

20. The method of claim 17, further comprising forming an annular channel along the thrust collar (324, 524, 724, 924) that is orthogonal to a labyrinth seal of the thrust collar (324, 524, 724, 924).

* * * * *